Figure 1:
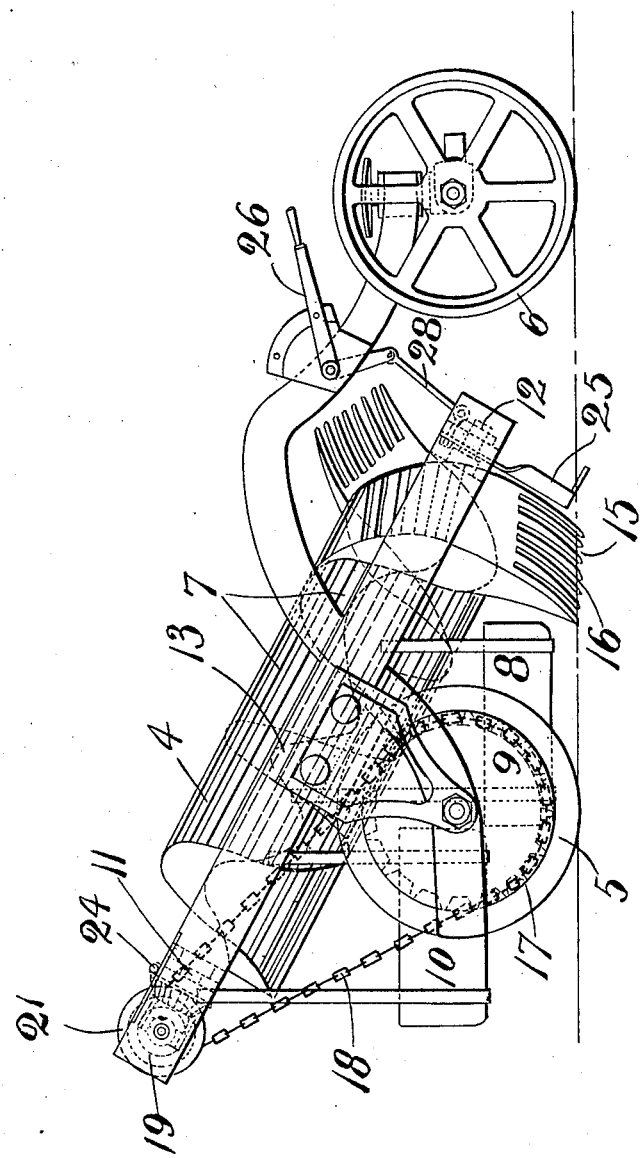

No. 872,166. PATENTED NOV. 26, 1907.
R. S. BAXTER.
MACHINE FOR HARVESTING POTATOES.
APPLICATION FILED FEB. 14, 1907.

3 SHEETS—SHEET 1.

WITNESSES:
INVENTOR
Robert Simpson Baxter
BY
ATTY

No. 872,166. PATENTED NOV. 26, 1907.
R. S. BAXTER.
MACHINE FOR HARVESTING POTATOES.
APPLICATION FILED FEB. 14, 1907.

3 SHEETS—SHEET 2.

WITNESSES
INVENTOR
Robert Simpson Baxter
BY
ATTY.

No. 872,166. PATENTED NOV. 26, 1907.
R. S. BAXTER.
MACHINE FOR HARVESTING POTATOES.
APPLICATION FILED FEB. 14, 1907.

3 SHEETS—SHEET 3.

WITNESSES
INVENTOR
Robert Simpson Baxter

ATTY

UNITED STATES PATENT OFFICE.

ROBERT SIMPSON BAXTER, OF BROUGHTY FERRY, SCOTLAND, ASSIGNOR TO JAMES URQUHART, OF DUNDEE, SCOTLAND.

MACHINE FOR HARVESTING POTATOES.

No. 872,166.     Specification of Letters Patent.     Patented Nov. 26, 1907.

Application filed February 14, 1907. Serial No. 357,234.

*To all whom it may concern:*

Be it known that I, ROBERT SIMPSON BAXTER, a subject of the King of Great Britain and Ireland, residing at Broughty Ferry, Scotland, (whose post-office address is Broughty Ferry, in the county of Forfar, Scotland,) has invented a certain new and useful Improvement in Machines for the Harvesting of Potatoes and other Root Crops, of which the following is a specification, reference being made therein to the accompanying drawings.

The object of my said invention is to harvest or raise potatoes, or other root crops out of the ground wherein they have grown; to collect or gather them together; to free them from loose earth or soil, to grade or select them according to certain sizes and to deliver them into baskets, carts, or other receptacles in any improved manner. And in order that my said invention and the manner of putting the same into practice may be properly understood, I have hereunto appended three explanatory sheets of drawings in which the same reference numerals are used to indicate corresponding parts in the figures shown.

Figure 2:
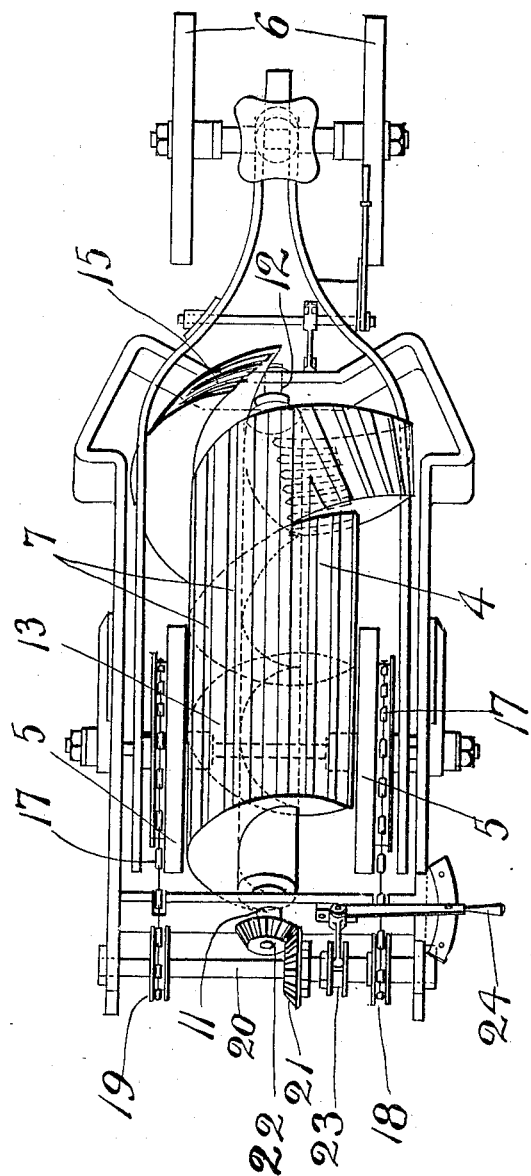
Figure 3:
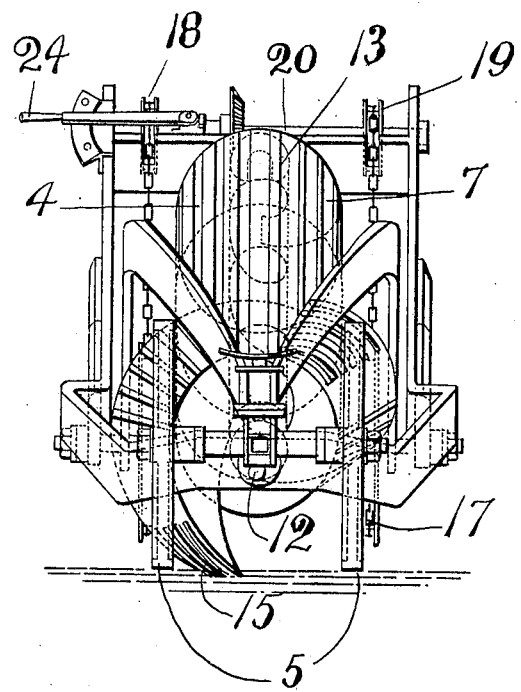
Figures 4, 5, 6:
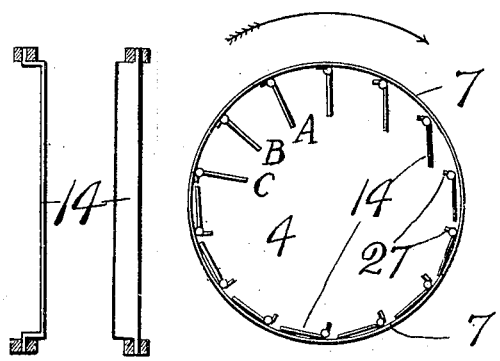

Figure 1 is a side elevation of a machine showing the main features of my invention. Fig. 2 is a plan. Fig. 3 is a front elevation of the machine. Fig. 4 is a cross-section of a modified form of cylinder showing the opening and the closing action of the hinged plates. Fig. 5 is a plan of a cranked rod and Fig. 6 is a plan of a pivoted plate showing the bearings.

My invention consists, in its simplest form, of a cylinder 4 of convenient diameter and length, pivoted on traveling wheels 5—the machine frame being mounted on wheels 5 and 6—and inclined at an angle to the ground and having diggers attached thereto, as afterwards described.

The cylinder 4 which constitutes the body of the machine, may be constructed of rods, bars, laths, plates or cast metal, or a combination of any of them, with open spaces between the said rods, bars, laths or plates. The spaces 7 may be of the same width from end to end of the cylinder; or they may be of different widths in different sections of the cylinder and thus exercise a selective or grading action, by allowing the smaller potatoes in each section to fall through the side of the cylinder into suitable receptacles 8 and 9 underneath, while those remaining pass on and are delivered at the top into the receptacle 10.

The body of the cylinder may be constructed of a surface of net or perforated work, in place of the steel rods, bars, or plates, or along with them, and instead of being cylindrical, may, in some forms of machine be conoidal in shape. It is mounted or pivoted at 11 and 12 longitudinally so as to be capable of revolving on its axis, and is furnished internally with an Archimedean screw 13 which forms part of and revolves with it, in order that its contents may travel onwards and upwards as the cylinder revolves and such cylinder may have internal longitudinal shelves the purpose of which is to lift the contents so that the clods may be broken up as they fall therefrom. Internally projecting pins may be used for the same purpose. When longitudinal plates are used in the construction of the cylinder they may be pivoted lengthwise as shown by the plates 14 the pivots being at one edge so as to be capable of periodical motion during the revolution of the cylinder, such motion being effected by gravity by causing their free edges to seek the lowest position unless when otherwise constrained by the casing of the cylinder or when in the positions A. B. and C. by the stops 27 for the purpose of freeing themselves from any material which would otherwise tend to block the spaces. Instead of plates as in Fig. 6 rods bent to form cranks, as in Fig. 5 may be used. This motion can also be effected by mechanical means.

The lower end of the cylinder is furnished with a digger or diggers 15 constructed so that it, or they may enter the ground, or the side of the furrow, drill, or ridge horizontally, or parallel with the surface of the ground, while the cylinder itself is at an angle in a vertical plane therewith. The prongs, teeth or digging edge 16 of the digger may be set at an angle inclined forward towards the direction in which the machine travels sufficient to enable them to readily pass into the ground, or so that their path through the soil may be the resultant of their forward motion with the machine and their rotatory motion, as far as may be; that is to say the path of the digger or prongs is similar to the thread of a screw and is alternately in and out of the ground, *i. e.* the prongs are screwed into and out of the drill. The cylinder is connected with one or more traveling wheels 5 by suitable gearing—in the drawings I have shown it driven by chain wheels 17 fixed on traveling wheels 5 chains 18 operating other chain wheels 19 on the cross-shaft 20. On the cross-shaft is a bevel wheel 21 which drives another 22 keyed on the axle of the cylinder and so causing it to rotate as the machine moves forward. The bevel wheel 21 is set in or out of gear by a clutch 23 operated by a lever 24. The breadth of the digger and the said gearing are so related that each revolution of the cylinder may bring the digger, or if more than one digger—two are shown in the drawings—may bring each digger to the place in the ground where the last digger left off. As stated above the lower end of the cylinder may be provided with more than one digger. There may also be more than one Archimedean screw, or part of such screw 13. The cylinder may have diggers and screws according to its capacity and diameter. The cylinder may carry a share 25 in front of the cylinder to raise up or loosen the soil. It may also be furnished with a lever, or other means for the purpose of raising or depressing the lower end of the cyilnder.

In the drawings I have shown a cranked lever 26 coupled to the frame which carries the cylinder by a rod 28.

A machine may be provided with more than one cylinder, as described, working on different rows of tubers, simultaneously.

The pitch of the wheels is such that they can run in the bottoms of the drills and such pitch may be adjustable so that the wheels can run in drills of various pitches.

The action of the machine is briefly as follows; When the machine is drawn forward the cylinder 4 or cylinders revolve and the digger 16 entering the ground, being set by the lever 26 to the desired height or depth, lifts the potatoes and the earth and conveys them into the body of the cylinder, the sides of which being of a partly open nature, allow the earth to fall through while the potatoes travel upwards and fall into different receptacles 8 9 and 10.

Having now described my invention what I claim as new and desire to secure by Letters Patent is;—

1. A potato harvester comprising an inclined cylindrical screen, a fan of spirally arranged arms projecting from the lower end thereof and teeth on the end of each arm.

2. A potato harvester comprising an inclined cylindrical screen, spirally arranged arms projecting from the lower end thereof, said arms being so arranged as to enter the ground horizontally and teeth on the end of each arm.

In witness whereof I have hereunto set my hand in presence of two witnesses.

ROBERT SIMPSON BAXTER.

Witnesses:
 GEO. C. DOUGLAS,
 A. C. DOUGLAS.